United States Patent [19]
Yasuda et al.

[11] Patent Number: 5,355,433
[45] Date of Patent: Oct. 11, 1994

[54] STANDARD PATTERN COMPARING SYSTEM FOR ELIMINATING DUPLICATIVE DATA ENTRIES FOR DIFFERENT APPLICATIONS PROGRAM DICTIONARIES, ESPECIALLY SUITABLE FOR USE IN VOICE RECOGNITION SYSTEMS

[75] Inventors: Seigou Yasuda, Yokosuka, Japan; Peter Grennan, Eastbourne, England

[73] Assignee: Ricoh Company, Ltd., Tokyo, Japan

[21] Appl. No.: 670,789

[22] Filed: Mar. 18, 1991

[30] Foreign Application Priority Data

Mar. 26, 1990 [JP] Japan ................................. 2-76463

[51] Int. Cl.$^5$ .............................................. G10L 9/00
[52] U.S. Cl. .................................................. 395/2.52
[58] Field of Search ................................. 381/41–46; 395/2.52

[56] References Cited

U.S. PATENT DOCUMENTS

| | | | |
|---|---|---|---|
| 4,624,010 | 11/1986 | Takebayashi | 381/43 |
| 4,677,569 | 6/1987 | Nakano et al. | 381/43 |
| 4,776,016 | 10/1988 | Hansen | 381/43 |

FOREIGN PATENT DOCUMENTS

| | | |
|---|---|---|
| 0191354 | 8/1986 | European Pat. Off. . |
| 3129282 | 2/1983 | Fed. Rep. of Germany . |
| 3129353 | 2/1983 | Fed. Rep. of Germany . |
| 3216800 | 3/1988 | Fed. Rep. of Germany . |

OTHER PUBLICATIONS

Brochure entitled "Voice Master Key A Voice Recognition System," *Voice Master & Speech Thing*, Date unknown (ordered Feb. 14, 1989, and obtained by applicant on Apr. 12, 1989) Co. Covox Inc. pp. 1–4.

*Primary Examiner*—Michael R. Fleming
*Assistant Examiner*—Michelle Doerrler
*Attorney, Agent, or Firm*—Mason, Fenwick & Lawrence

[57] ABSTRACT

A standard pattern comparing system recognizes a data by comparing the data with a standard pattern registered in a dictionary, a plurality of kinds of data being supplied to the standard pattern comparing system. The standard pattern comparing system has a plurality of dictionaries including a plurality of normal dictionaries and one master dictionary. All standard patterns stored in each normal dictionary and some of the standard patterns stored in the master dictionary corresponding to one kind of data. There being no duplicate standard pattern included in more than two dictionaries, and each standard pattern included in the master dictionary being commonly used for at least more than two normal dictionaries to correspond to an arbitrary kind of data. The present invention is especially useful for a voice recognition system in which a speaker dependent voice recognizer is used for a personal computer which manages a plurality of application programs. A user of the voice recognizer does not have to register some duplicate words commonly used for at least more than two application programs because of the master dictionary.

10 Claims, 5 Drawing Sheets

FIG.3 PRIOR ART

| WORD NUMBER | STRING | VOICE DICTIONARY DATA |
|---|---|---|
| 1 | directory | DATA 1 |
| 2 | copy | DATA 2 |
| 3 | display | DATA 3 |
| 4 | | |

FIG.4 PRIOR ART

| WORD NUMBER | APPLICATION 1 WORDS | APPLICATION 2 WORDS | APPLICATION 3 WORDS |
|---|---|---|---|
| 1 | CENTERING | PRINT | LINE |
| 2 | PRINT | UNDERSCORE | START |
| 3 | FILE | END | INPUT |
| 4 | END | SAMPLE | YES |
| 5 | REFERENCE | YES | NO |
| | YES | NO | END |

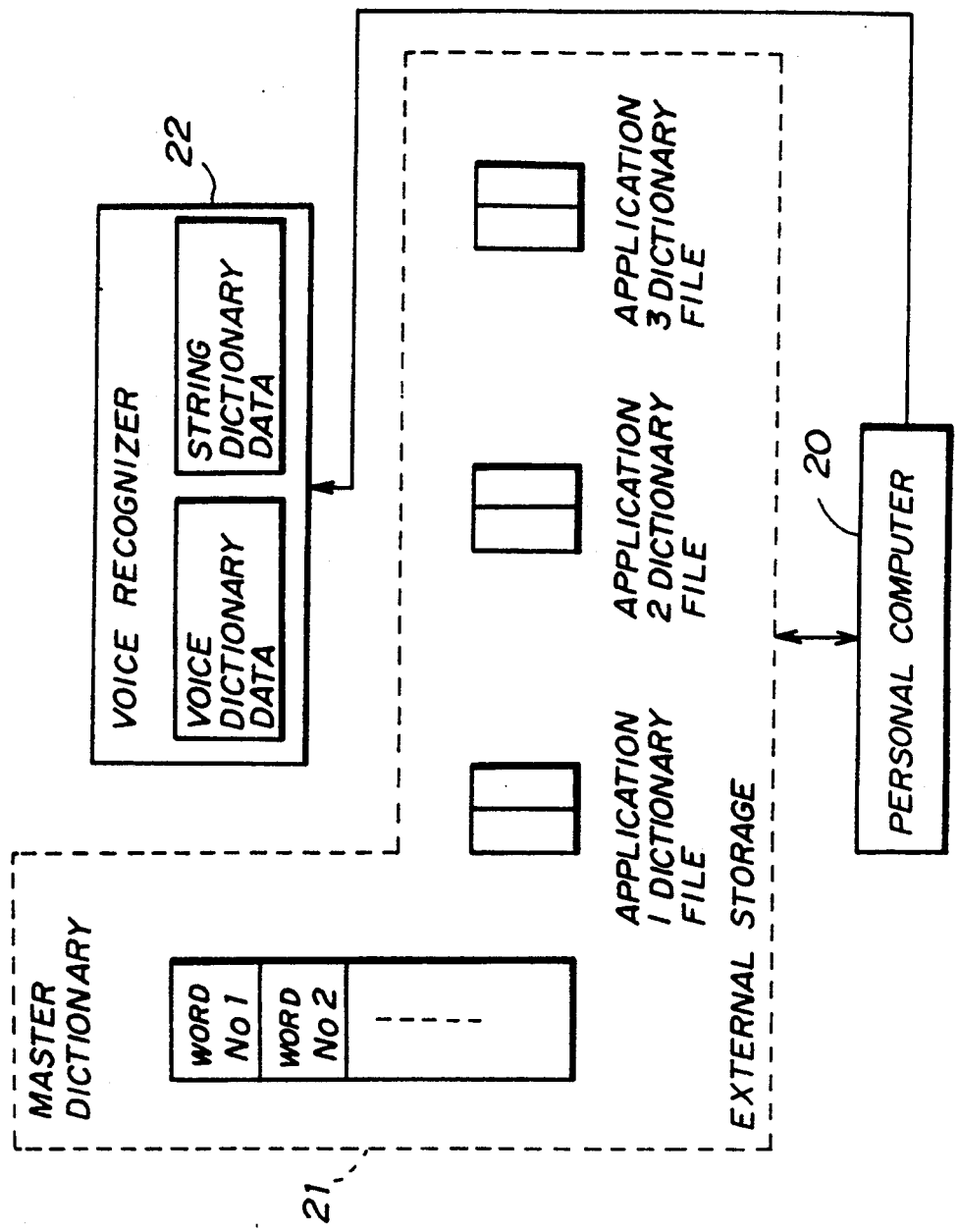

STANDARD PATTERN COMPARING SYSTEM FOR ELIMINATING DUPLICATIVE DATA ENTRIES FOR DIFFERENT APPLICATIONS PROGRAM DICTIONARIES, ESPECIALLY SUITABLE FOR USE IN VOICE RECOGNITION SYSTEMS

BACKGROUND OF THE INVENTION

The present invention relates generally to standard pattern comparing systems which recognize data by comparing it with a standard pattern registered in a dictionary stored therein, and more particularly to a standard pattern comparing system which uses a proper dictionary in accordance with the kind of data. The present invention also relates to a method for writing out a dictionary used for such a standard pattern comparing system. The present invention is especially useful for a voice recognition system in which a speaker dependent voice recognizer is used with a personal computer which manages a plurality of application programs.

The conventional voice recognition system having a voice recognizer used with a personal computer which manages a plurality of application programs comprises, as shown in FIG. 1, a personal computer 1, an external storage device 2, a voice recognizer 3, and a communication line 4. The personal computer 1 is coupled to the voice recognizer 3 via the communication line 4. The personal computer controls the voice recognizer 3, for example, when a voice dictionary is written out. The personal computer 1 comprises a central processing unit (abbreviated CPU hereinafter) 1a, a memory 1b and a communication controller 1c. The external storage device 2 comprises a voice dictionary data file 2a and a string dictionary data file 2b. The external storage device 2 may comprise a hard disk. The voice recognizer 3, which is a speaker dependent voice recognizer, comprises a recognition part 3a, a voice dictionary data 3b and a string dictionary data 3c. When the voice dictionary is written out, it is temporarily stored in the voice recognizer 3. Since the voice dictionary is volatile in the voice recognizer 3, it is transmitted to the external storage device 2 to be stored therein. The voice dictionary comprises voice dictionary data 3b and string dictionary data 3c. The voice dictionary data 3b specifies a feature of a pronunciation of a word, and the string dictionary data 3c specifies the spelling of the word. The voice and string dictionary data 3b and 3c are respectively stored in voice and string dictionary data files 2a and 2b in the external storage device 2. The voice dictionary is prepared for every application program. The voice recognizer 3 further comprises, as shown in FIG. 2, a microphone 10, a feature-extractor 11, a recognition part 12, voice dictionary data 13, string dictionary data 14, and a plotter 15. As is already known, the feature extractor 11 extracts a feature amount of a voice input from the microphone 10 to generate a feature pattern corresponding to the feature amount. The feature pattern is transmitted to the recognition part 12. The recognition part 12 recognizes the feature pattern by comparing it with the voice dictionary data 13, and outputs a recognition result to the string dictionary data 14. The string dictionary data 14 transmits a string column corresponding to the recognition result to the personal computer 1 via the plotter 15. Voice dictionary data 13 corresponds to string dictionary data 14 for a word number, as shown in FIG.3. A plurality of application programs can be used in the personal computer 1 at the same time.

However, the above conventional recognition system has the following disadvantage. A user must register some duplicate words used for at least more than two application programs, such as "END", "YES" and "NO" as shown in FIG. 4, for every application program, which is troublesome. This disadvantage is present in all standard pattern comparing systems which recognize input data by comparing it with a standard pattern registered therein, the standard pattern comparing system using properly a plurality of standard patterns in accordance with the kind of the input data,

SUMMARY OF THE INVENTION

Accordingly, it is a general object of the present invention to provide a novel and useful standard pattern comparing system in which the above problem is eliminated.

Another object of the present invention is to provide a standard pattern comparing system which recognizes data by means of comparing it with a standard pattern effectively registered in a dictionary stored therein, the standard pattern comparing system using a proper dictionary in accordance with the kind of data.

The more specific object of the present invention is to provide a standard pattern comparing system which recognizes data by comparing it with a standard pattern registered in a dictionary, a plurality of kinds of data being supplied to the standard pattern comparing system, and which standard pattern comparing system comprises a memory which stores a plurality of dictionaries therein, the dictionaries comprising a plurality of normal dictionaries and one master dictionary, all standard patterns stored in each normal dictionary and some of the standard patterns stored in the master dictionary corresponding to one kind of data, there being no duplicate standard pattern included in more than two dictionaries, and each standard pattern included in the master dictionary being commonly used for at least two normal dictionaries to correspond to an arbitrary kind of data, selection means, coupled to the memory, for selecting a corresponding 10 one of the normal dictionaries and the master dictionary from the memory based on the data, and comparing means, responsive to the selection means, for comparing the data with the standard pattern registered in the corresponding one of the normal dictionaries and a master dictionary.

Another more specific object of the present invention is to provide a method for writing out a dictionary in a standard pattern comparing system which recognizes data by comparing with a standard pattern registered in a dictionary, a plurality of kinds of data to be supplied to the standard pattern comparing system, and which method comprises the steps of writing out a basic dictionary by gathering all standard patterns required for one arbitrary kind of data, and writing out a plurality of normal dictionaries and one master dictionary by extracting a duplicate standard pattern including more than two basic dictionaries from each basic dictionary, all standard patterns stored in each normal dictionary and a part of standard patterns stored in the master dictionary corresponding to one kind of data, each standard pattern included in the master dictionary being commonly used for at least two normal dictionaries to correspond to an arbitrary kind of the data.

According to the present invention, a duplicate standard pattern is never registered in each dictionary because of the master dictionary so that the standard pattern is effectively registered.

Other objects and further features of the present invention will become apparent from the following detailed description when read in conjunction with the accompanying drawings.

BRIEF DESCRIPTION OF THE DRAWINGS

FIGS. 1 to 4 show a view for explaining a conventional voice recognition system;

FIG. 7 shows a view for explaining an external storage device used for the voice recognition system shown in FIG.5.

DESCRIPTION OF THE PREFERRED EMBODIMENTS

Figure 1:
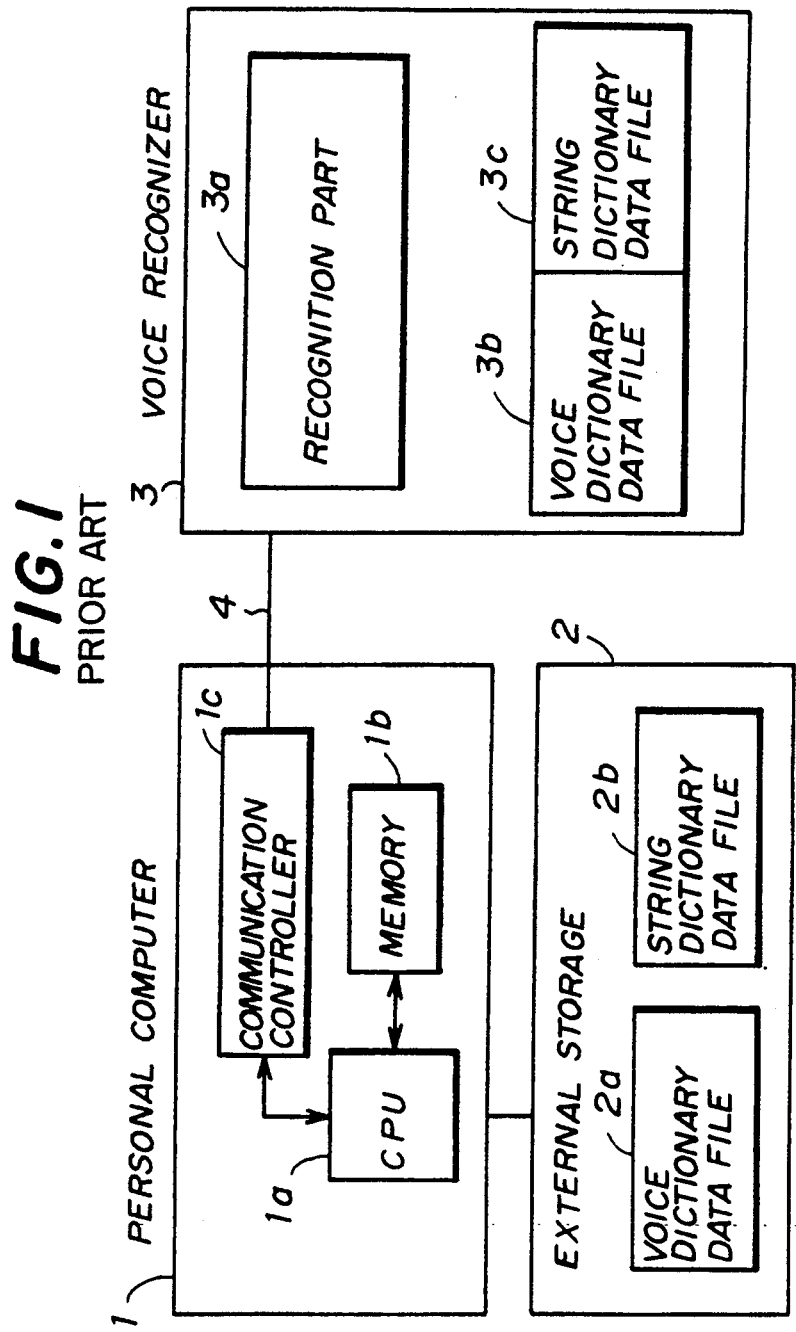
Figure 2:
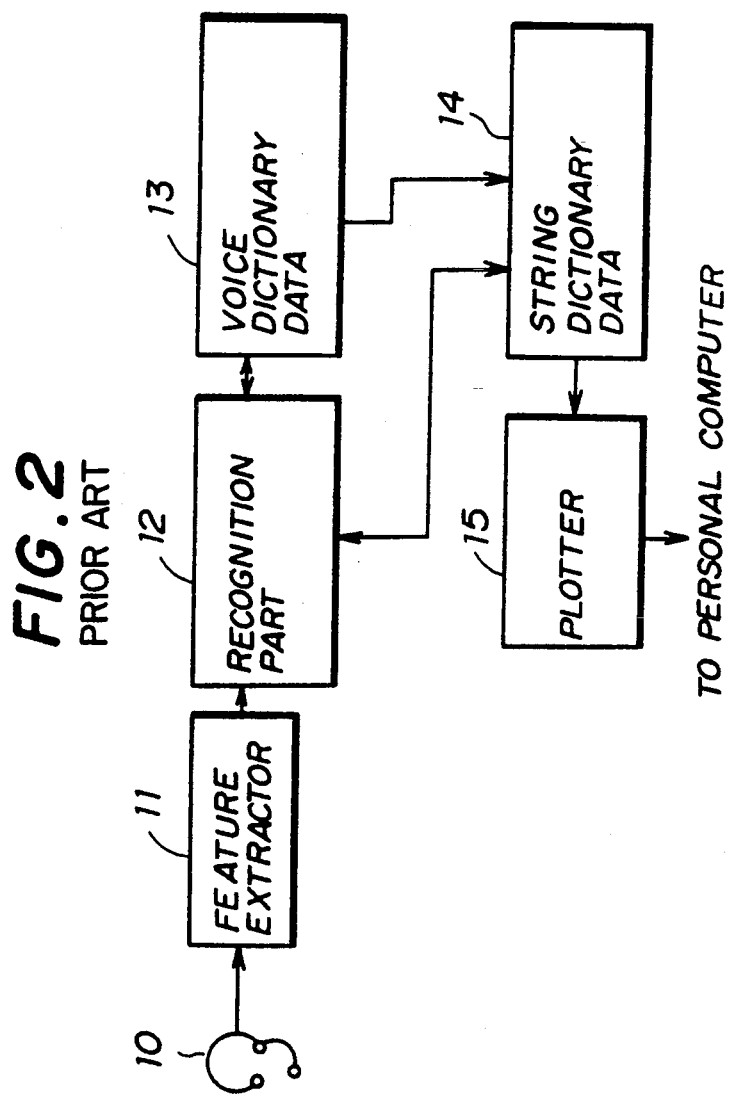
Figure 5:
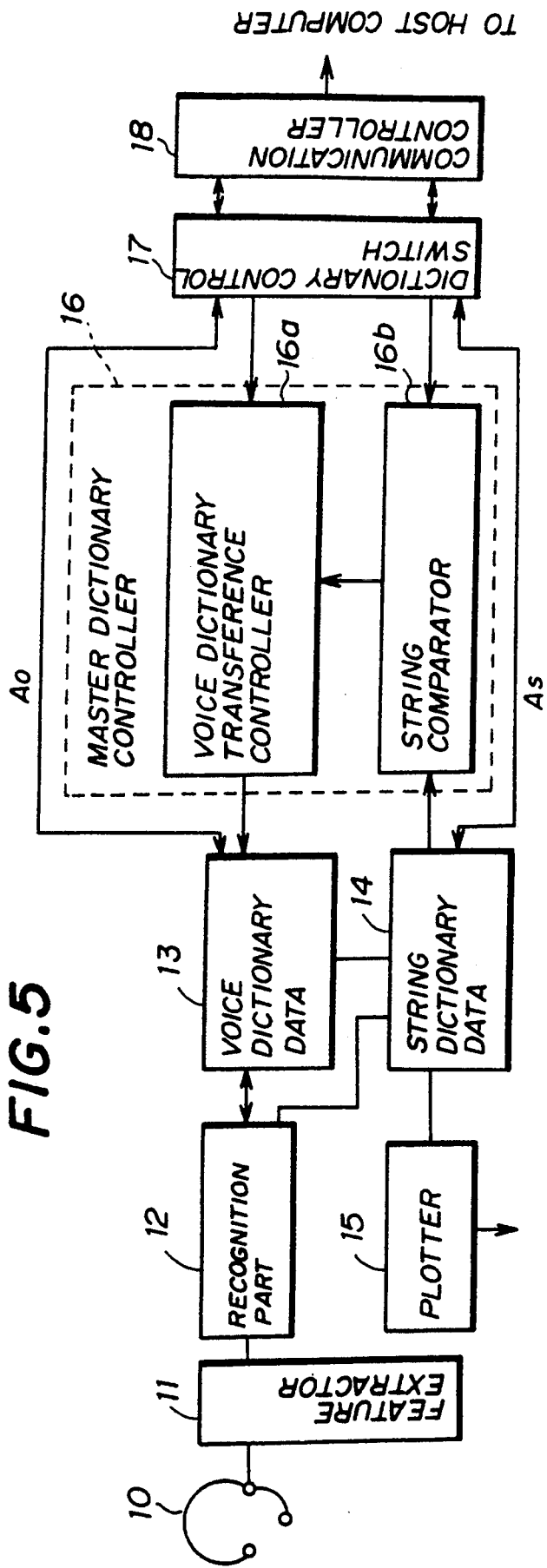
FIG. 5 shows a block diagram of a voice recognizer of a voice recognition system according to the present invention.

The voice recognizer of the voice recognition system according to the present invention comprises, as shown in FIG.5, the microphone 10, the feature extractor 11, the recognition part 12, the voice dictionary data 13, the string dictionary data 14, the plotter 15, a master dictionary controller 16, a dictionary control switch 17, and a communication controller 18. Those elements which are the same as corresponding elements in FIG.2 are designated by the same reference numerals, and a description thereof will be omitted. The dictionary files are stored in an external storage 21, such as a hard disk, used for a personal computer 20. The external storage device 21, as shown in FIG. 7, has application files therein. Each application file is transmitted to a voice recognizer 22. Either the voice or string dictionary data is selected by the dictionary control switch 17, and is transmitted via a corresponding path $A_O$ or $A_S$.

Figure 6:
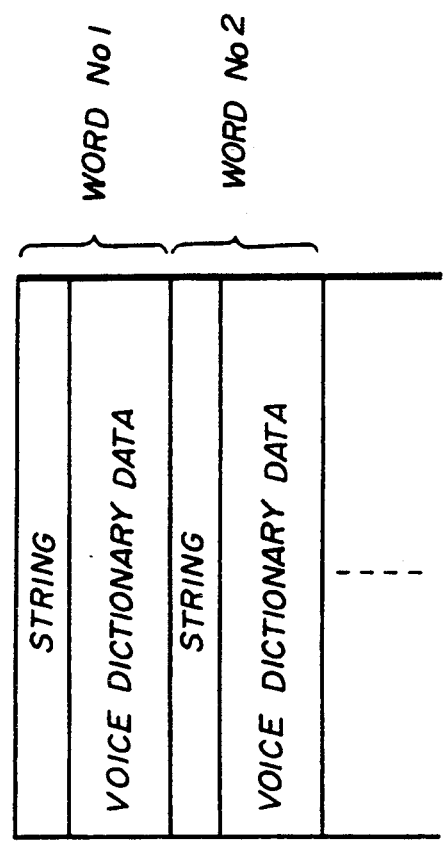
FIG. 6 shows a view for explaining an example of a master dictionary used for the voice recognition system shown in FIG.5.

The external storage device 21 comprises a master dictionary. The master dictionary comprises voice and string dictionary data, as shown in FIG.6. These two dictionaries may be respectively stored in different files. The master dictionary is generated by extracting a word used for at least two application programs. Therefore, there is no duplicate word included in at least two application dictionaries. The number of words registered in the master dictionary increases when a new application dictionary is generated.

A user transmits new string dictionary data of a new application program to the voice recognizer 22 via the communication controller 18. The user does not have to register all the words required for the new application program, and he/she can omit the registering of some words which are included in the master dictionary. Each string dictionary data of the new application program is compared with that of the master dictionary by the string comparator 16b of the master dictionary controller 16. If there is a corresponding string, the voice dictionary data corresponding to the string is transmitted to the personal computer 20 via the voice dictionary transference controller 16a of the master dictionary controller 16.

When the voice recognition system according to the present invention is operated, some words in the master dictionary and corresponding words in the application dictionary are used for the voice input from the microphone 10 by Dynamic Time Warping. As mentioned above, the voice is analyzed to detect a feature thereof, and compared with the voice and string dictionary data to judge whether or not the voice corresponds to the voice and string dictionary data. The judging result is output as a recognition result. Thus, according to the present invention, the user does not have to register some duplicate words commonly used for at least two application programs because of the master dictionary.

Further, the present invention is not limited to these preferred embodiments, but various variations and modifications may be made without departing from the scope of the present invention.

What is claimed is:

1. A standard pattern comparing system to which a plurality of kinds of data are supplied and which recognizes data by comparing the data with standard patterns registered in a dictionary, the system comprising:
   a) a memory which stores a plurality of dictionaries, the dictionaries including:
      1) a plurality of normal dictionaries, and
      2) one master dictionary; wherein:
      1) all standard patterns stored in each normal dictionary correspond to one kind of data;
      2) there are no duplicate standard-patterns included in at least two normal dictionaries, and
      3) each standard pattern included in the master dictionary is commonly used for at least two normal dictionaries to correspond to an arbitrary kind of data;
   b) selection means, coupled to the memory, for selecting a corresponding one of the normal dictionaries and the master dictionary from the memory, based on the data;
   c) comparing means, responsive to the selection means, for comparing the data with one of the standard patterns stored in the corresponding one of the normal dictionaries and the master dictionary;
   d) output means, responsive to the comparing means, for outputting a comparison result for recognizing the data; and
   e) analyzing means for analyzing the feature of the data so as to generate a feature pattern corresponding to the feature.

2. A standard pattern comparing system to which a plurality of kinds of data are supplied and which recognizes data by comparing the data with standard patterns registered in a dictionary, the system comprising:
   a) a memory which stores a plurality of dictionaries, the dictionaries including:
      1) a plurality of normal dictionaries; and
      2) one master dictionary;
   wherein:
      1) all standard patterns stored in each normal dictionary correspond to one kind of data;
      2) there are no duplicate standard patterns included in at least two normal dictionaries; and
      3) each standard pattern included in the master dictionary is commonly used for at least two normal dictionaries to correspond to an arbitrary kind of data;
   b) selection means, coupled to the memory, for selecting a corresponding one of the normal dictionaries and the master dictionary from the memory, based on the data;

c) comparing means, responsive to the selection means, for comparing the data with one of the standard patterns stored in the corresponding one of the normal dictionaries and the master dictionary; and d) output means, responsive to the comparing means, for outputting a comparison result for recognizing the data.

3. The system of claim 2, wherein:

a) the standard pattern comparing system is especially suitable for use in a voice recognition system;

b) the data includes a voice input to the voice recognition system; and c) the voice recognition system includes:
1) a voice recognizer operating in conjunction with the standard pattern comparing system;
2) a personal computer for controlling operations of the voice recognizer, the voice being a kind of data corresponding to an application program used in the personal computer; and
3) an external storage device connected to the personal computer.

4. A method for writing out a plurality of dictionaries in a standard pattern comparing system to which a plurality of kinds of data are supplied and which recognizes data by comparing the data with standard patterns registered in a dictionary, the method comprising the steps of:

a) writing out a plurality of basic dictionaries, each basic dictionary being written out by gathering all standard patterns required for an arbitrary kind of data; and b) writing out (1) a plurality of normal dictionaries and (2) one master dictionary, by extracting from each basic dictionary a duplicate standard pattern included in at least two basic dictionaries;

wherein:

all standard patterns stored in each normal dictionary correspond to one kind of data;

there are no duplicate standard patterns included in at least two normal dictionaries; and each standard pattern included in the master dictionary is commonly used for at least two normal dictionaries to correspond to an arbitrary kind of data.

5. A standard pattern comparing system according to claim 3, wherein said voice recognizer further comprises:

voice analyzing means for analyzing the voice input;

comparing means, responsive to the analyzing means, for comparing an analyzing result of the analyzing means with the standard patterns;

judging means, responsive to the comparing means, for judging whether or not the result of the analyzing means corresponds to the standard pattern; and plotter means, responsive to the judging means, for plotting a judging result of the judging means as a recognition result.

6. The method of claim 4, wherein:

a) the writing out steps include using a standard pattern comparing system;

b) the standard pattern comparing system is especially suitable for use in a voice recognition system;

c) the data includes a voice input to the voice recognition system; and d) the voice recognition system includes:
1) a voice recognizer operating in conjunction with the standard pattern comparing system;
2) a personal computer for controlling operations of the voice recognizer, the voice being a kind of data corresponding to an application program used in the personal computer; and
3) an external storage device connected to the personal computer.

7. The method of claim 6, wherein the voice recognizer further includes:

voice analyzing means for analyzing a voice input;

comparing means, responsive to the analyzing means, for comparing an analyzing result of the analyzing means with the standard patterns;

judging means, responsive to the comparing means, for judging whether or not the analyzing result of the analyzing means corresponds to the standard pattern; and plotter means, responsive to the judging means, for plotting as a recognition result, a judging result of the judging means.

8. A method for writing out a plurality of dictionaries in a standard pattern comparing system to which a plurality of kinds of data are supplied and which recognizes data by comparing the data with standard patterns registered in a dictionary, the method comprising the steps of:

A) writing out a plurality of basic dictionaries, each basic dictionary being written out by gathering all standard patterns required for an arbitrary kind of data; and B) writing out (1) a plurality of normal dictionaries and (2) one master dictionary, by extracting from each basic dictionary a duplicate standard pattern included in at least two basic dictionaries;

wherein:

a) all standard patterns stored in each normal dictionary correspond to one kind of data;

b) there are no duplicate standard patterns included in at least two normal dictionaries;

c) each standard pattern included in the master dictionary is commonly used for at least two normal dictionaries to correspond to an arbitrary kind of data;

d) the master and normal dictionary further include:
1) a voice dictionary for specifying a feature of a pronunciation of a word of a voice input; and
2) a string dictionary for specifying the spelling of the word thereof; and e) the standard pattern of the basic dictionary includes voice and string data corresponding to the voice and string dictionaries.

9. The method of claim 8, wherein a duplicate standard pattern is extracted by a step of:

comparing each string data of the standard pattern of the basic dictionary with the string dictionaries of the master and normal dictionaries.

10. The method of claim 8, wherein a duplicate standard pattern is extracted by a step of:

comparing each voice data of the standard pattern of the basic dictionary with the voice dictionaries of the master and normal dictionaries.

* * * * *